(12) United States Patent
Wang et al.

(10) Patent No.: US 12,449,533 B1
(45) Date of Patent: Oct. 21, 2025

(54) METHOD OF A TRUST-REGION SPACEBORNE DUAL-BASELINE INTERFEROMETRIC SAR SYSTEM

(71) Applicant: Aerospace Information Research Institute, Chinese Academy of Sciences, Beijing (CN)

(72) Inventors: Yu Wang, Beijing (CN); QingYue Yang, Beijing (CN); YaChao Wang, Beijing (CN)

(73) Assignee: Aerospace Information Research Institute, Chinese Academy of Sciences, Beijing (CN)

( * ) Notice: Subject to any disclaimer, the term of this patent is extended or adjusted under 35 U.S.C. 154(b) by 0 days.

(21) Appl. No.: 19/171,082

(22) Filed: Apr. 4, 2025

(30) Foreign Application Priority Data

Apr. 19, 2024 (CN) .......................... 202410473833.3

(51) Int. Cl.
G01S 13/90 (2006.01)
B64G 1/10 (2006.01)
G06F 30/367 (2020.01)

(52) U.S. Cl.
CPC ........ G01S 13/9094 (2013.01); B64G 1/1035 (2023.08); G01S 13/9023 (2013.01); G06F 30/367 (2020.01)

(58) Field of Classification Search
CPC ............ G01S 13/9094; G01S 13/9023; G06F 30/367; B64G 1/1035
See application file for complete search history.

(56) References Cited

U.S. PATENT DOCUMENTS

| 12,280,895 | B1 * | 4/2025 | Wang | ....................... B64G 1/24 |
| 2002/0050942 | A1 * | 5/2002 | Grisham | ............. G01S 13/9023 |
| | | | | 342/25 C |

(Continued)

FOREIGN PATENT DOCUMENTS

| CN | 105487065 A | * | 4/2016 | ................ G01S 7/41 |
| CN | 106569211 A | * | 4/2017 | ............. G01S 13/90 |

(Continued)

Primary Examiner — Nuzhat Pervin
(74) Attorney, Agent, or Firm — Seed IP Law Group LLP

(57) ABSTRACT

A design method of a trust region satellite-borne dual-base interference SAR system is provided, relating to the field of radar measurement. Firstly, error sources of the interference SAR system are classified and analyzed, phase errors caused by image decoherence are calculated according to wave positions, and an analytical expression of baseline-related errors is reserved; a maximum phase error caused by imaging processing and an electronic device are estimated; and a baseline error is estimated. Then, the phase errors and the baseline errors are converted into elevation errors through an elevation fuzzy number, thereby obtaining an analytical expression of the elevation errors and the baseline parameters (length and dip angle). With a relative height measurement accuracy index of the system as an optimization object, a feasible solution interval between the baseline length and the baseline dip angle of the system is solved through a trust region algorithm. A minimum value of the baseline length is corrected according to a flying-around safety distance of a dual-satellite formation. According to the method of the present disclosure, the design of the satellite-borne dual-base interference SAR system can be guided, so that the satellite-borne dual-base interference SAR system is ensured to carry out terrain elevation surveying and mapping tasks with high accuracy and high reliability.

6 Claims, 1 Drawing Sheet

(56) References Cited

U.S. PATENT DOCUMENTS

2004/0150547 A1\* 8/2004 Suess ................. G01S 13/9054
                                                         342/25 A
2021/0109210 A1\* 4/2021 Kabakian ............ G01S 13/9004

FOREIGN PATENT DOCUMENTS

| CN | 108983239 | A | * | 12/2018 | ......... G01S 13/9023 |
| CN | 109324326 | A | * | 2/2019  | ............... G01S 7/40 |
| CN | 110823191 | A | * | 2/2020  | ......... G01S 13/9023 |
| CN | 113281747 | A | * | 8/2021  | ......... G01S 13/9023 |

\* cited by examiner

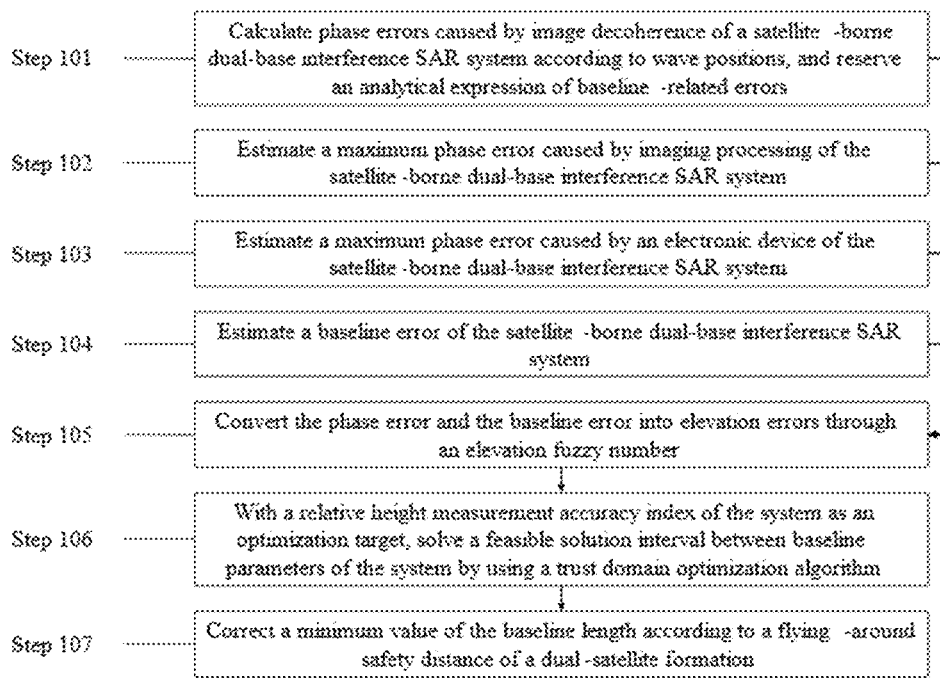

METHOD OF A TRUST-REGION SPACEBORNE DUAL-BASELINE INTERFEROMETRIC SAR SYSTEM

BACKGROUND

Technical Field

The present disclosure relates to the field of radar measurement, in particular to a design method of a trust region satellite-borne dual-base interference SAR system.

Description of the Related Art

A satellite-borne dual-base interference synthetic aperture radar (SAR) system is an interference SAR system that has both an interference height measurement capability and a differential interference deformation measurement capability, and its different applications are controlled through a satellite formation mode. In a flying-around mode, two satellites are combined to have an interference height measurement capability, while a main satellite in the formation has the capabilities to independently perform imaging observation and deformation measurement. In a follow-up mode, any single satellite has the capability to independently complete an imaging observation task and the capability to realize surface deformation measurement through multiple flybys, and the two satellites are combined to have the capability to realize high-efficiency surface deformation measurement through multiple flybys. In the process of switching the flying-around mode to the follow-up mode, the main satellite in the formation always maintains strict recursive orbit control to ensure long-term and continuous single-satellite deformation measurement. Combined with SAR's own all-weather, all-day, multi-mode, and multi-polarization characteristics, the dual-base interference SAR system may be widely applied in geology, land, earthquake, disaster reduction, surveying and mapping, forestry, military-civilian integration and other fields.

Baselines of a cross-orbit plane (hereinafter referred to as baselines) are important parameters in interference SAR processing. The design of the baselines seriously affects the accuracy of interference SAR elevation measurement and deformation measurement. In the event of analyzing the impact of the baselines on interference SAR elevation measurement, the baselines are usually divided into vertical baselines and parallel baselines. The vertical baseline is defined as a component of the baseline perpendicular to a radar beam line of sight; and the parallel baseline is defined as a component of the baseline parallel to the radar beam line of sight. On the one hand, the vertical baseline affects the coherence of interference data. The longer the vertical baseline is, the more serious the baseline decoherence is. On the other hand, the vertical baseline affects an ambiguity height of the interference system (a height change corresponding to a 2π phase change is caused to characterize the sensitivity of interference measurement to an elevation change). The longer the vertical baseline is, the smaller the ambiguity height is and the higher the accuracy of interference height measurement is. Therefore, the selection of the vertical baseline needs to comprehensively consider a relationship between baseline decoherence and ambiguity height to obtain an elevation measurement result that meets accuracy requirements. However, the only effect of the vertical baseline on interference SAR deformation measurement is decoherence, and the appeal at this time is that the smaller the vertical baseline, the better. It is noted that although the concepts of the vertical baseline and the parallel baseline are clearer from an analytical perspective, and both vary with a radar viewing angle, the concepts of a baseline length and a baseline dip angle are more concise and essential from a parameter design perspective. Therefore, in summary, the design of the satellite-borne dual-base interference SAR system is mainly aimed at an elevation measurement task in the flying-around mode, thereby determining baseline parameters that meet elevation accuracy indexes of the system, including the baseline length and the baseline dip angle.

The elevation accuracy is divided into absolute elevation accuracy and relative elevation accuracy. The absolute elevation accuracy is defined as a mean square error of a difference from a noise-free reference digital elevation model (DEM). The relative elevation accuracy is defined as a standard deviation relative to a reference DEM product. When the absolute height measurement accuracy is characterized, it is necessary to consider a full-link error of the system; and when the relative height measurement is characterized, it is only necessary to consider slow variables and random quantities within a certain time and space range. Therefore, error sources considered in the process of evaluating the relative height measurement accuracy and the absolute height measurement accuracy are not the same. The relative height measurement error sources of the interference system may be divided into the following three categories: phase errors caused by various decoherence factors and phase errors introduced in the processing process; phase errors caused by residual errors after correction by a central electronic device; and phase errors caused by residual errors after baseline correction. The absolute height measurement error sources of the interference system may be divided into relative height measurement errors, single-satellite orbit errors, baseline fixed errors and slant range measurement errors. Gross errors in absolute elevation errors may generally be calibrated through calibration points, so we are mainly concerned with relative height measurement accuracy.

At present, the development of satellite-borne dual-base interference SAR systems in China is still in its infancy, and there is insufficient experience in the design of system parameters. Therefore, it is urgent to propose a design method of a trust region satellite-borne dual-base interference SAR system to guide the determination of parameters of the satellite-borne dual-base interference SAR system so as to meet the needs of high-accuracy terrain surveying and mapping.

BRIEF SUMMARY

In order to solve the above technical problems, the present disclosure proposes a design method of a trust region satellite-borne dual-base interference SAR system. In this method, elevation error sources that are not related to a baseline are taken as maximum values in a typical scenario, and elevation error sources that are related to the baseline are parameterized. Then, with a set elevation accuracy index as an optimization object, an analytical expression of a relationship between elevation errors and baseline parameters is solved through a trust region optimization algorithm to obtain a baseline parameter interval that meets requirements. Finally, the solved parameter interval is corrected according to other restrictive conditions of the system.

To fulfill the above-mentioned object, the present disclosure adopts the following technical solutions.

A design method of a trust region satellite-borne dual-base interference SAR system includes the following steps:
  step 1, calculating phase errors caused by image decoherence of the satellite-borne dual-base interference SAR system according to wave positions, and reserving an analytical expression of errors related to baseline parameters, wherein the baseline parameters include a baseline length and a baseline dip angle;
  step 2, estimating a maximum phase error caused by imaging processing of the satellite-borne dual-base interference SAR system;
  step 3, estimating a maximum phase error caused by an electronic device of the satellite-borne dual-base interference SAR system;
  step 4, estimating baseline errors of the satellite-borne dual-base interference SAR system;
  step 5, converting the phase errors caused by image decoherence of the satellite-borne dual-base interference SAR system in step 1, the maximum phase error caused by imaging processing of the satellite-borne dual-base interference SAR system in step 2, the maximum phase error caused by the electronic device of the satellite-borne dual-base interference SAR system in step 3 and the baseline errors of the satellite-borne dual-base interference SAR system in step 4 into elevation errors through an elevation fuzzy number to obtain an analytical expression of a relationship between the elevation errors and the baseline parameters;
  step 6, with a relative height measurement accuracy index of the system as an optimization object, solving the analytical expression of the relationship between the elevation errors and the baseline parameters obtained in step 5 through a trust region optimization algorithm to obtain a feasible solution interval between the baseline length and the baseline dip angle; and
  step 7, correcting a minimum value of the baseline length according to a flying-around safety distance of a dual-satellite formation.

The present disclosure has the following beneficial effects.

Since the present disclosure comprehensively considers various error sources, the designed system parameters can meet height measurement accuracy requirements under various conditions. In addition, the present disclosure may provide an important reference for system design for designers of the satellite-borne dual-base interference SAR system.

BRIEF DESCRIPTION OF THE SEVERAL VIEWS OF THE DRAWINGS

FIG. 1 is a flowchart of a design method of a trust region satellite-borne dual-base interference SAR system of the present disclosure.

DETAILED DESCRIPTION

The following will clearly and completely describe the technical solutions in the embodiments of the present disclosure in conjunction with the accompanying drawings in the embodiments of the present disclosure. Obviously, the described embodiments are only some embodiments of the present disclosure, not all embodiments. Based on the embodiments in the present disclosure, all other embodiments derived by a person of ordinary skill in the art without creative efforts shall fall within the protection scope of the present disclosure.

In conjunction with one embodiment of the present disclosure, a design method of a trust region satellite-borne dual-base interference SAR system is provided. As shown in FIG. 1, the design method includes the following steps.

At step 101: phase errors caused by image decoherence of the satellite-borne dual-base interference SAR system are calculated according to wave positions, and an analytical expression of baseline-related errors is reserved. Baseline parameters include a baseline length and a baseline dip angle. The baseline-related errors indicate errors related to the baseline parameters.

The image decoherence mainly includes quantization noise decoherence, Doppler decoherence, sidelobe decoherence, registration error decoherence, ambiguity decoherence, thermal noise decoherence, volume scattering decoherence, baseline decoherence and other factors. Some decoherence factors are also related to system factors, scene topography and terrain slopes. In the event of performing specific analysis, decoherence coefficients may be calculated for typical terrain slopes (0 slopes, 20% front slope surfaces, and 20% back slope surfaces) and typical landforms (rocky soil and forest) at each wave position (a central incident angle of the wave position is taken). Then, minimum decoherence coefficients of each wave position under six conditions are taken for subsequent analysis. The six conditions refer to conditions of three typical terrain slopes under two landforms, respectively.

Next, a calculation method for the decoherence of each image is given.

(1) Quantization Noise Decoherence:

Quantization noise decoherence is derived from the quantization of original recorded signals, which are usually approximated as Gaussian white noise, and a quantization noise decoherence coefficient $\gamma_{SQNR}$ may be expressed as (assuming that quantization noises of two images subjected to interference processing are consistent):

$$\gamma_{SQNR} = \frac{1}{1 + SQNR^{-1}} \qquad (1)$$

wherein, SQNR is a quantitative signal-to-noise ratio.

(2) Doppler Decoherence:

When interference data is acquired, Doppler frequency shift caused by a difference in beam pointing along an azimuth direction may also cause decoherence. A Doppler decoherence coefficient $\gamma_{fdc}$ may be expressed as:

$$\gamma_{fdc} = 1 - \frac{|\Delta f_{dc}|}{B_d} \qquad (2)$$

Wherein, $\Delta_{fdc}$ represents a Doppler center frequency difference between main and auxiliary images, and $B_d$ represents a Doppler bandwidth.

(3) Sidelobe Decoherence:

Since a point target imaging processing result is in the form of a sinc function, there will always be an impact of sidelobes on main lobes of other objects. In comprehensive consideration of the impacts of nearby objects, a sidelobe decoherence coefficient $\gamma_{sidelobe}$ may be expressed as (assuming that integral sidelobe ratios of two images subjected to interference processing are consistent):

$$\gamma_{sidelobe} = \frac{1}{1 + ISLR} \qquad (3)$$

wherein, ISLR is an integral sidelobe ratio.

(4) Registration Error Decoherence:

A registration error decoherence coefficient $\gamma_{coreg}$ may be expressed as:

$$\gamma_{coreg} = \frac{\sin(\pi\mu)}{\pi\mu} \tag{4}$$

wherein, $\mu$ represents the number of pixels with registration errors in an azimuth or range direction.

(6) Ambiguity Decoherence:

The ambiguity decoherence is caused by both range ambiguity RASR and azimuth ambiguity AASR. An ambiguity decoherence coefficient $\gamma_{amb}$ may be expressed as:

$$\gamma_{amb} = \frac{1}{1+RASR} \cdot \frac{1}{1+AASR} \tag{5}$$

The specific expressions of the range ambiguity and the azimuth ambiguity are relatively complicated. Considering that the ambiguity decoherence is not a dominant factor in the overall decoherence and the ambiguity problem can be well suppressed by an ambiguity suppression algorithm, in the present disclosure, typical values of the range ambiguity RASR and the azimuth ambiguity AASR are taken and set as constants. In addition, in view that an ambiguity decoherence coefficient of the rocky soil landform is smaller than that of a forest area under the same conditions, and the influence of decoherence is more serious, in the present disclosure, a typical value of ambiguity under the rocky soil landform is used to calculate the ambiguity decoherence.

(5) Thermal Noise Decoherence:

Thermal noise decoherence is affected by system parameters, scene topography and terrain slope. A thermal noise decoherence coefficient $\gamma_{SNR}$ may be expressed as:

$$\gamma_{SNR} = \frac{1}{\sqrt{(1+SNR_1^{-1})(1+SNR_2^{-1})}} \tag{6}$$

wherein, $SNR_1$ and $SNR_2$ represent signal-to-noise ratio of a main interference channel and a signal-to-noise ratio of an auxiliary interference channel, and a calculation formula is $$SNR = \frac{\sigma_0(\theta_i - \tau)}{NESZ(\theta_i - \tau)};$$

$\sigma_0$ is a backscattering coefficient; NESZ is a noise equivalent backscattering coefficient; $\theta_i$ is a local incident angle; and $\tau$ is a current slope angle.

As can be seen from formula (6), 1) regardless of scene topography, the thermal noise decoherence is not obvious at a near end, and the decoherence is more serious at a far end due to the decrease in SNR; 2) the thermal noise decoherence on a front slope is better than that on the flat ground, and the thermal noise decoherence on the flat ground is better than that on a back slope; and 3) the thermal noise decoherence of rocky soil is better than that of forest. As described above, in the event of performing specific analysis, the thermal noise decoherence coefficients may be calculated for typical terrain slopes (0 slopes, 20% front slope surfaces, and 20% back slope surfaces) and typical landforms (rocky soil and forest) at each wave position (a central incident angle of this wave position is taken). Then, minimum thermal noise decoherence coefficients of each wave position under six conditions are taken for subsequent analysis.

(7) Volume Scattering Decoherence:

Volume scattering decoherence is determined by both system parameters and scene topography. For vegetation areas, when electromagnetic waves propagate in scatterers, decoherence caused by volume scattering is determined by a vegetation scattering elevation and an attenuation function of the electromagnetic waves. An expression of a volume scattering decoherence coefficient $\gamma_{vol}$ is:

$$\gamma_{vol} = \int_0^{h_v} \sigma^0(z) \cdot \exp\left(j2\pi \frac{z}{h_{amb}}\right) \cdot dz / \int_0^{h_v} \sigma^0(z) \cdot dz \tag{7}$$

wherein, $z$ is an integration variable; $h_v$ is a vegetation height; exp( ) represents an exponential function; j represents an imaginary unit; and $\sigma^0(z)$ is an attenuation function of vegetation to the electromagnetic waves, expressed as:

$$\sigma^0(z) = \exp\left[-2 \cdot \beta \cdot \frac{h_v - z}{\cos(\theta_i)}\right] \tag{8}$$

wherein, $\beta$ is a one-way extinction coefficient of the electromagnetic waves in the vegetation, which is 0.2 dB/m (i.e., 0.023 Np/m) for an L band; $\theta_i$ is a local incident angle (which can be directly calculated based on orbit parameters); and $h_{amb}$ is an ambiguity height, expressed as:

$$h_{amb} = \frac{\lambda R \sin\theta_i}{B_\perp} = \frac{\lambda R \sin\theta_i}{B \cos(\theta_0 - \alpha)} \tag{9}$$

wherein, $\lambda$ is a wavelength; R is a slant range of a main satellite; $B_\perp = B\cos(\sigma_0 - a)$ is a vertical baseline; B is a length of a baseline on a cross-orbit plane; $\theta_0$ is a downward viewing angle corresponding to a reference surface (which can be directly calculated based on the orbit parameters); and «is a baseline dip angle.

As can be seen from formula (9), a vegetation height $h_v$ affects volume scattering decoherence. Therefore, a volume scattering decoherence effect of the forest landform is much higher than that of the rocky soil landform, while a volume scattering decoherence effect of the rocky soil landform is almost negligible. In addition, an ambiguity height $h_{amb}$ also affects the volume scattering decoherence. At one wave position, in the present disclosure, a relationship between the ambiguity height $h_{amb}$ and the volume scattering decoherence coefficient $\gamma_{vol}$ is fitted through a quadratic polynomial, and the volume scattering decoherence coefficient $\gamma_{vol}$ may be expressed as:

$$\gamma_{vol} = p_2 h_{amb}{}^2 + p_1 h_{amb}{}^1 + p_0 \tag{10}$$

wherein, $p_0$-$p_2$ are fitted polynomial coefficients, and a constant value may be taken at each wave position. $h_{amb}{}^1$ and $h_{amb}{}^2$ represent two ambiguity heights.

(8) Baseline Decoherence:

The existence of a baseline causes a difference in incident angles of main and auxiliary antennas, resulting in baseline decoherence. The longer a vertical baseline is, the more serious the decoherence is. Baseline decoherence is related to system parameters and terrain slope. A baseline decoherence coefficient $\gamma_{baseline}$ may be expressed as:

$$\gamma_{baseline} = 1 - \frac{B_\perp}{B_{\perp,crit}} \quad (11)$$

wherein, $B_\perp = B\cos(\theta_0 - a)$ is a vertical baseline; and $B_{\perp,crit}$ is an extreme baseline, i.e., a maximum vertical baseline with coherence between main and auxiliary antennas, which can be expressed as:

$$B_{\perp,crit} = \frac{2B_{rg}\lambda R \tan(\theta_i - \tau)}{c} \quad (12)$$

wherein, $B_{rg}$ is a bandwidth in a range direction; $\lambda$ is a wavelength; R is a slant range of a main satellite; $\theta_i$ is a local incident angle; $\tau$ is a local slope angle; and c is a velocity of light.

All the above decoherence factors are multiplied to obtain an overall decoherence coefficient $\gamma$:

$$\gamma = \gamma_{SQNR} \cdot \gamma_{fdc} \cdot \gamma_{sidelobe} \cdot \gamma_{coreg} \cdot \gamma_{amb} \cdot \gamma_{SNR} \cdot \gamma_{vol} \cdot \gamma_{baseline} \quad (13)$$

$$= \gamma_{other} \cdot (p_2 \cdot h_{amb}^2 + p_1 \cdot h_{amb}^1 + p_0) \cdot \left(1 - \frac{B_\perp}{B_{\perp,crit}}\right)$$

$$= \gamma_{other} \cdot \left[p_2 \cdot \left(\frac{\lambda R \sin\theta_i}{B_\perp}\right)^2 + p_1 \cdot \left(\frac{\lambda R \sin\theta_i}{B_\perp}\right) + p_0\right] \cdot$$

$$\left(1 - \frac{cB_\perp}{2B_{rg}\lambda R \tan(\theta_i - \tau)}\right)$$

$$= \gamma_{other} \cdot \left[p_2 \cdot \left(\frac{\lambda R \sin\theta_i}{B_\perp}\right)^2 + p_1 \cdot \left(\frac{\lambda R \sin\theta_i}{B_\perp}\right) + p_0\right] \cdot (1 - p_{-1}B_\perp)$$

$$= \gamma_{other} \cdot \left(p_2' \frac{1}{B_\perp^2} + p_1' \frac{1}{B_\perp} + p_0' + p_{-1}'B_\perp\right)$$

$$= \gamma_{other} \cdot$$

$$\left(p_2' \frac{1}{[B\cos(\theta_0 - \alpha)]^2} + p_1' \frac{1}{B\cos(\theta_0 - \alpha)} + p_0' + p_{-1}'B\cos(\theta_0 - \alpha)\right)$$

wherein, intermediate parameters are $\gamma_{other} = \gamma_{SQNR} \cdot \gamma_{fdc} \cdot \gamma_{sidelobe} \cdot \gamma_{coreg} \cdot \gamma_{amb} \cdot \gamma_{SNR}$ and $$p_{-1} = \frac{c}{2B_{rg}R\tan(\theta_i - \tau)};$$

and all parameters with a superscript' are intermediate parameters and have no meaning. $p_2 = p_2 \cdot (\lambda R \sin \theta_i)^2$, $p_1 = p_1 \cdot (\lambda R \sin \theta_i) - p_2 p_{-1}$, $p_0 = p_0 - p_1 p_{-1} \cdot (\lambda R \sin \theta_i)$ and $p_{-1} = -P_0 p_{-1}$. At each wave position, except for two parameters of baseline length and baseline dip angle to be optimized in formula (13), all other parameters are known.

In a multi-view case, all the above decoherence factors may be converted into an interference phase error $\sigma_{coherence}$ caused by image decoherence according to the following formula:

$$\sigma_{coherence} = \sqrt{\frac{1 - \gamma^2}{2L\gamma^2}} \quad (14)$$

wherein, L is a multi-view number, which may also change depending on wave positions.

At step 102: a maximum phase error caused by imaging processing of the satellite-borne dual-base interference SAR system is estimated.

(1) Imaging Algorithm Error:

A two-dimensional spatial variation of satellite-borne dual-base SAR imaging echoes greatly increases the difficulty of imaging processing. Different dual-base SAR imaging algorithms have different two-dimensional spectrum accuracy, which will introduce different degrees of phase errors and ultimately affect the interference performance of the system.

(2) Multi-Channel Reconstruction Error:

In the process of dual-satellite interference height measurement, since a single satellite uses an azimuth-direction dual-channel technology to improve an azimuth-direction resolution during data reception, certain phase errors will be introduced in the dual-channel reconstruction process.

A maximum phase error introduced by imaging processing may be obtained by adding a maximum phase error introduced by an imaging algorithm and a maximum phase error introduced by the multi-channel reconstruction process, which is denoted as $\sigma_{algorithm}$.

At step 103: a maximum phase error caused by an electronic device of the satellite-borne dual-base interference SAR system is estimated.

Phase errors caused by the electronic device may mainly be derived from residual errors after the correction of the electronic device, which may be divided into three categories.

(1) A dual-satellite system adopts a multi-channel mode of one transmission and dual receptions in an azimuth direction, so there will be multi-channel phase errors introduced by a channel phase center position deviation, an attitude measurement error and a phase error between channels themselves. In summary, a total phase error caused by multiple channels may be obtained from the above three error sources.

(2) The system response of a transmitting and receiving loop of the system will change with temperature, and the instability of a transmitting and receiving channel of the system needs to be corrected through a calibration loop, so there will be the phase error introduced by the calibrated residual error.

(3) Since the dual-satellite system has phase errors caused by the instability of frequency sources due to the use of different frequency sources in main and auxiliary satellites, so phase synchronization is required. The phase error will be introduced by the residual phase error after phase synchronization.

A maximum phase error caused by the electronic device may be obtained by adding maximum phase errors caused by the three categories of residual errors corrected by the electronic device, which is denoted as $\sigma_{equipment}$.

At step 104: a baseline error of the satellite-borne dual-base interference SAR system is estimated.

The baseline measurement accuracy is an important factor affecting interference height measurement, and this error is mainly derived from a platform attitude error, an antenna phase center error and a GPS position measurement error, and is manifested in the form of a large fixed deviation and a small random error. The fixed deviation mainly affects the absolute height measurement accuracy, and can be removed by accurate DEM correction. A residual baseline error mainly affects the relative height measurement accuracy, and is manifested in the form of a random error. ΔB is denoted as a parallel baseline measurement error of the system, and ΔB is denoted as a vertical baseline measurement error of the system.

At step 105: the phase errors and the baseline errors are converted into elevation errors through an elevation fuzzy number. The phase errors include a phase error caused by decoherence, a phase error caused by imaging processing and a phase error caused by the electronic device respectively calculated in step 101 to step 103. The baseline errors are obtained from step 104.

The phase error caused by the image decoherence obtained in step 101, the maximum phase error caused by imaging processing obtained in step 102 and the maximum phase error caused by the electronic device obtained in step 103 can be converted into elevation errors by multiplying an elevation fuzzy number. Then, the parallel baseline error and the vertical baseline error obtained in step 104 are also converted into elevation errors through an elevation fuzzy number. It is noted that, for the sake of simplicity, the present disclosure does not consider the baseline errors in the event of analyzing the elevation errors caused by the first three. Therefore, a total elevation error Δh caused by all error sources is:

$$\Delta h = \frac{h_{amb}}{2\pi}(\sigma_{coherence} + \sigma_{algorithm} + \sigma_{equipment}) + \frac{h_{amb}}{\lambda}\Delta B + h \cdot \frac{\Delta B_\perp}{B_\perp} \quad (15)$$

As can be seen from formula (13) and formula (14), the interference phase error $\sigma_{coherence}$ caused by image decoherence is approximated as a vertical baseline increasing function, while the ambiguity height $h_{amb}$ is a vertical baseline decreasing function. In addition, the elevation error caused by the baseline error is a decreasing function of the vertical baseline. Therefore, Equation (15) mainly compromises the vertical baseline $B_\perp$ from two aspects: a phase error and an elevation error.

Formula (13) is written as $\gamma = P(B_\perp)$ to represent that $\gamma$ is a polynomial function of $B_\perp$, and then after the substitution of formula (9), as well as the abbreviated formula (13) and formula (14), this equation may be written as:

$$\Delta h = \frac{\lambda R \sin\theta_i}{2\pi B_\perp}\left(\sqrt{\frac{1-P(B_\perp)^2}{2LP(B_\perp)^2}} + \sigma_{algorithm} - + \sigma_{equipment}\right) + \frac{R\sin\theta_i}{B_\perp}\Delta B_1 + h \cdot \frac{\Delta B_\perp}{B_\perp} \quad (16)$$

It can be seen that this equation is a height nonlinear equation with respect to the vertical baseline $B_\perp$ and therefore also a height nonlinear equation with respect to the baseline length B and the baseline dip angle α. When derivatives of the analytic expression about B and α are calculated, a relationship between the two parameters and $B_\perp$ should be solved as an implicit function to greatly simplify the operation.

At step 106: with a relative height measurement accuracy index of the system as an optimization target, a feasible solution interval between the baseline parameters of the system is solved through a trust region optimization algorithm.

That is, the analytical expression of the relationship between the elevation errors and the baseline parameters obtained in step 5 is solved through the trust region optimization algorithm to obtain a feasible solution interval between the baseline length and the baseline dip angle of the system.

According to the analytic expression (15) or (16) of the elevation errors and the baseline length as well as baseline dip angle obtained in step 105, a parameter interval that meets requirements can be solved with Δh being less than a relative elevation accuracy index of the system as an optimization object. Because the expression of formula (15) or formula (16) is highly nonlinearized and contains a plurality of parameters, the trust domain optimization algorithm is adopted in the present disclosure for solving. After the feasible parameter intervals of all wave positions are solved one by one, an interval intersection is calculated to obtain a final parameter interval (different parameters may also be used for different wave positions).

At step 107: a minimum value of the baseline length is corrected according to a flying-around safety distance of a dual-satellite formation.

Since the height measurement task is performed in a flying-around mode of the dual-satellite formation, it is necessary to ensure that the baseline length is greater than a shortest safety distance (denoted D) between satellites. Therefore, a minimum baseline parameter value (denoted as $B_{min}$) solved in step 106 may be corrected as:

$$B_{min} = \begin{cases} D, B_{min} < D \\ B_{min}, B_{min} \geq D \end{cases} \quad (17)$$

The technical solutions of the present disclosure will be further described below in conjunction with the specific embodiments.

Embodiment 1

A Lutan-1 (LT-1) L-band differential interference SAR satellite consists of two 3m-resolution L-band synthetic aperture radar satellites with the same design status. The two satellites are sent into an orbit by two CZ-4C rockets in the mode of "one rocket and one satellite", and after entering the orbit, they will fly in turn according to a flying-around mode and a follow-up mode. An engineering task of LT-1 is to operate in a predetermined orbit; establish a ground system for the reception, transmission, processing, distribution and calibration of corresponding satellite remote sensing data; establish application demonstration conditions; promote the construction of multi-user application systems; achieve the functions of single/dual satellite heavy orbit differential interferometric deformation measurement, dual-satellite orbit interference height measurement, single/multi-polarization imaging in accordance with multi-mission planning requirements; complete observation tasks such as surface deformation measurement and digital elevation model acquisition in designated areas; support and serve territorial resources, earthquakes, disaster prevention and mitigation, basic geographic information acquisition, forestry and civil-military integration and other application needs; and form a rapid response capability for major disasters.

According to the design method of dual-base interference SAR baseline parameters in the specific implementation, the system baseline parameters are designed in combination with a relative elevation accuracy index of less than 5 m in LT-1. Image decoherence is calculated first. SQNR=18 dB is taken to obtain $\gamma_{SQNR}$=0.98; $\Delta f_{dc}$=11 Hz and $B_d$=2426 Hz are obtained according to a 0.01° beam pointing error, and $\gamma_{fdc}$=0.97 is further obtained; ISLR=−15 dB is taken to obtain $\gamma_{sidelobe}$=0.97; the high-accuracy registration is usually considered as that μ is 0.1 pixel, and a coherence coefficient obtained by considering two registration directions in a range direction and an azimuth direction is $\gamma_{coreg}$=0.97; for ambiguity decoherence, an approximate value is $\gamma_{amb}$=0.995; and the thermal noise decoherence is related to system factors, so a back slope of 20% and $\gamma_{SNR}$ under the forest landform are calculated under different wave positions, respectively. Volume scattering decoherence, as well as baseline decoherence, are reserved in the form of analytic expressions for parameter optimization.

A maximum phase error caused by imaging processing is calculated. According to the simulation analysis, a phase error value caused by Generic SAR Processor Algorithm is approximately 0.5°, and the magnitude of a multi-channel reconstruction error is approximately 0.015°.

Electronic device errors are further calculated according to error categories. Through the simulation analysis, when the channel phase center position deviation is 1 mm, a phase error after imaging is 0.8°; and when an attitude measurement error is 0.003°, the phase error after imaging is 0.13°, and a phase error between channels themselves is 0.35°, so a phase error caused by multiple channels is totally 1.28°. For a single satellite, a residual error after internal calibration correction is approximately 0.7°, and an error after imaging processing is approximately 0.7°. A residual error after synchronous phase correction is approximately 2°, and an error after imaging processing is 0.8°.

For the baseline error, the simulation analysis verifies that a random error of GPS position measurement is 1 mm, a SAR phase center offset is 1 mm, and an attitude measurement error is 0.003°; and meanwhile, in conjunction with spatial variation characteristics of a parallel baseline and a vertical baseline, measurement errors of the parallel baseline and the vertical baseline are $\Delta B$=2 mm and $\Delta B_\perp$=2.24 mm, respectively.

Based on the above error sources, according to a requirement that the relative elevation accuracy of LT-1 is less than 5 m, a finally calculated vertical baseline range is about 1 km to 5.2 km.

Although the specific illustrative embodiments of the present disclosure are described above, the present disclosure may be understood by a person skilled in the art. In addition, it should be clear that the present disclosure is not limited to the scope of specific embodiments. For a person of ordinary skill in the art, as long as various changes are within the spirit and scope of the present disclosure limited and determined by the attached claims, these changes are obvious, and all disclosures and creations that make use of the present disclosure are protected.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A design method of a trust region satellite-borne dual-base interference SAR Synthetic Aperture Radar system, comprising the following steps:
   step 1, calculating phase errors caused by image decoherence of the satellite-borne dual-base interference SAR system according to wave positions, and reserving an analytical expression of errors related to baseline parameters, wherein the baseline parameters comprise a baseline length and a baseline dip angle;
   step 2, estimating a maximum phase error caused by image processing of the satellite-borne dual-base interference SAR system;
   step 3, estimating a maximum phase error caused by an electronic device of the satellite-borne dual-base interference SAR system;
   step 4, estimating baseline errors of the satellite-borne dual-base interference SAR system;
   step 5, converting the phase errors caused by image decoherence of the satellite-borne dual-base interference SAR system in step 1, the maximum phase error caused by image processing of the satellite-borne dual-base interference SAR system in step 2, the maximum phase error caused by the electronic device of the satellite-borne dual-base interference SAR system in step 3 and the baseline errors of the satellite-borne dual-base interference SAR system in step 4 into elevation errors through an elevation fuzzy number to obtain an analytical expression of a relationship between the elevation errors and the baseline parameters;
   step 6, with a relative height measurement accuracy index of the system as an optimization object, solving the analytical expression of the relationship between the elevation errors and the baseline parameters obtained in step 5 through a trust region optimization algorithm to obtain a feasible solution interval between the baseline length and the baseline dip angle; and
   step 7, correcting a minimum value of the baseline length according to a flying-around safety distance of a dual-satellite formation.

2. The design method of the trust region satellite-borne dual-base interference SAR system according to claim 1, wherein the image decoherence of the satellite-borne dual-base interference SAR system in step 1 comprises quantization noise decoherence, Doppler decoherence, sidelobe decoherence, registration error decoherence, ambiguity decoherence, thermal noise decoherence, volume scattering decoherence and baseline decoherence; decoherence coefficients are calculated for typical terrain slopes and typical landforms at each wave position, and then a minimum decoherence coefficient of each wave position is taken for subsequent analysis; the typical terrain slopes are 0 slopes, 20% front slope surfaces, and 20% back slope surfaces; and the typical landforms are rocky soil and forest.

3. The design method of the trust region satellite-borne dual-base interference SAR system according to claim 2, wherein the step 2 comprises: estimating a maximum phase error introduced by an imaging algorithm and a maximum phase error introduced by a multi-channel reconstruction process respectively, and adding the two errors to obtain the maximum phase error caused by image processing of the satellite-borne dual-base interference SAR system.

4. The design method of the trust region satellite-borne dual-base interference SAR system according to claim 3, wherein the step 3 comprises: estimating a phase error caused by multiple channels, a phase error caused by an internal calibration residual error and a residual phase error after phase synchronization respectively, and adding the three errors to obtain the maximum phase error caused by the electronic device of the satellite-borne dual-base interference SAR system.

5. The design method of the trust region satellite-borne dual-base interference SAR system according to claim 4, wherein the step 4 comprises: estimating a vertical baseline error and a parallel baseline error respectively according to a platform attitude error, an antenna phase center error and a GPS position measurement error.

6. The design method of the trust region satellite-borne dual-base interference SAR system according to claim 5, wherein the step 6 comprises: calculating an intersection of the feasible solution intervals of the baseline parameters for all wave positions to obtain a final baseline parameter interval.

* * * * *